United States Patent

[11] 3,553,376

[72] Inventors Peter Bogaart
1521 16th St. N.W., Canton, 44703;
Kenneth D. Rowe, 211 Hartford Drive,
Hudson, Ohio 44236

[21] Appl. No. 756,029
[22] Filed Aug. 28, 1968
[45] Patented Jan. 5, 1971

[54] REMOTE METER READING METHOD AND APPARATUS
16 Claims, 12 Drawing Figs.

[52] U.S. Cl. .................................................... 179/2, 340/151
[51] Int. Cl. .................................................... H04m 11/00
[50] Field of Search .................................................... 179/2R16; 340/180, 185, 150, 151, 177

[56] References Cited

UNITED STATES PATENTS

| | | | |
|---|---|---|---|
| 1,802,643 | 4/1931 | Floyd | 179/2(R) |
| 2,870,258 | 1/1959 | Cooper | 179/2(R) |
| 3,072,894 | 1/1963 | Chapin | 179/2(R) |
| 3,142,726 | 7/1964 | Brothman et al. | 179/2(R) |
| 3,231,670 | 1/1966 | Lang et al. | 340/180X |
| 3,274,584 | 9/1966 | Morgan et al. | 340/347 |
| 3,352,971 | 11/1967 | Nilsson et al. | 179/2(R) |
| 3,400,378 | 9/1968 | Smith et al. | 340/172.5 |

*Primary Examiner*—Kathleen H. Claffy
*Assistant Examiner*—William A. Helvestine
*Attorney*—Paul E. Milliken

ABSTRACT: An apparatus for reading at a central station a multidial meter such as a utility meter or similar device located at a remote station by transmitting coded pulses representative of the digits shown on the meter over a conventional telephone line and decoding the pulses at a central station. To obtain a reading of any specific customer's meter, a master translator unit at the central station sends out a signal through the telephone system to a slave translator unit which is electromechanically connected to the customer's meter in such manner that a series of binary coded drums in the slave unit store coded information representing the amount of utility service used by the customer. The slave unit is designed to individually scan each bit of information stored in the coded drums and send a sequence of pulses through the telephone line with each pulse being representative of one bit of information. Upon receiving each pulse, the master translator unit sends it through a certain predetermined circuit to the proper location in a decoder which converts the information either into readable digits or into an output for a computer which compares the output with stored information on previous meter readings for computing the customer's bill.

INVENTORS.
PETER BOGAART
KENNETH D. ROWE
BY
ATTORNEY

INVENTORS.
PETER BOGAART
BY KENNETH D. ROWE

ATTORNEY

INVENTORS.
PETER BOGAART
BY KENNETH D. ROWE

[signature]
ATTORNEY

INVENTORS.
PETER BOGAART
KENNETH D. ROWE
BY [signature]
ATTORNEY

INVENTORS.
PETER BOGAART
BY KENNETH D. ROWE
[signature]
ATTORNEY

INVENTORS.
PETER BOGAART
BY KENNETH D. ROWE
ATTORNEY

REMOTE METER READING METHOD AND APPARATUS

PRIOR ART

The closest prior art known to applicants are U.S. Pat. Nos. 1,889,597, issued to A. S. Fitzgerald; No. 1,902,465, issued to W. H. Pratt; No. 2,784,393, issued to H. B. Schultheis, Jr.; No. 3,231,670 issued to R. E. Lane et al.; No. 3,352,971, issued to N. E. Nilsson et al.; and No. 3,377,429, issued to L. J. Schwartzkopf et al. The above listed prior art discloses various means of remote meter reading. The main difficulty with the prior are devices is that the equipment required to perform this function has been so complicated and expensive that it has not been practical to use it as a substitute for the usual procedure of sending a meter reader to the customer's home. Assuming that one piece of equipment at the central station can be used to read any number of meters, the expense of such equipment is not as great a problem as the expense of equipment at each remote meter to be read. The cost of the reading equipment at each remote meter, however, is a very important factor in determining whether or not the entire system will be sufficiently economical to replace the procedure of sending meter readers on periodic visits to each meter, since the cost of that equipment must be multiplied by the number of meters to be read. Obviously, if the equipment at the meter is too expensive, it would be cheaper to use visiting meter readers.

OBJECTS OF THE INVENTION

It is a primary object of this invention to provide a remote meter reading apparatus which is less expensive than sending a meter reader to visit the home of the utility customer.

Another object of this invention is to provide a meter reading apparatus which utilizes a conventional telephone system for transmitting signals representing the amount shown on the meter from the remote meter to the central station.

Still another object of this invention is to eliminate the human error which may be made when meters are manually read and the information is manually recorded.

A still further object of this invention is to minimize the amount of time required for each meter reading.

Another object of this invention is to provide a remote meter reading system which may be easily connected to a computer and automatic billing equipment thereby providing automatic computation of the customer's bill from the information provided by the reading apparatus.

These and other objects of the invention will become more fully apparent as the description proceeds in the following specifications and the appended drawings.

DESCRIPTION OF PREFERRED EMBODIMENTS

Figure 1:
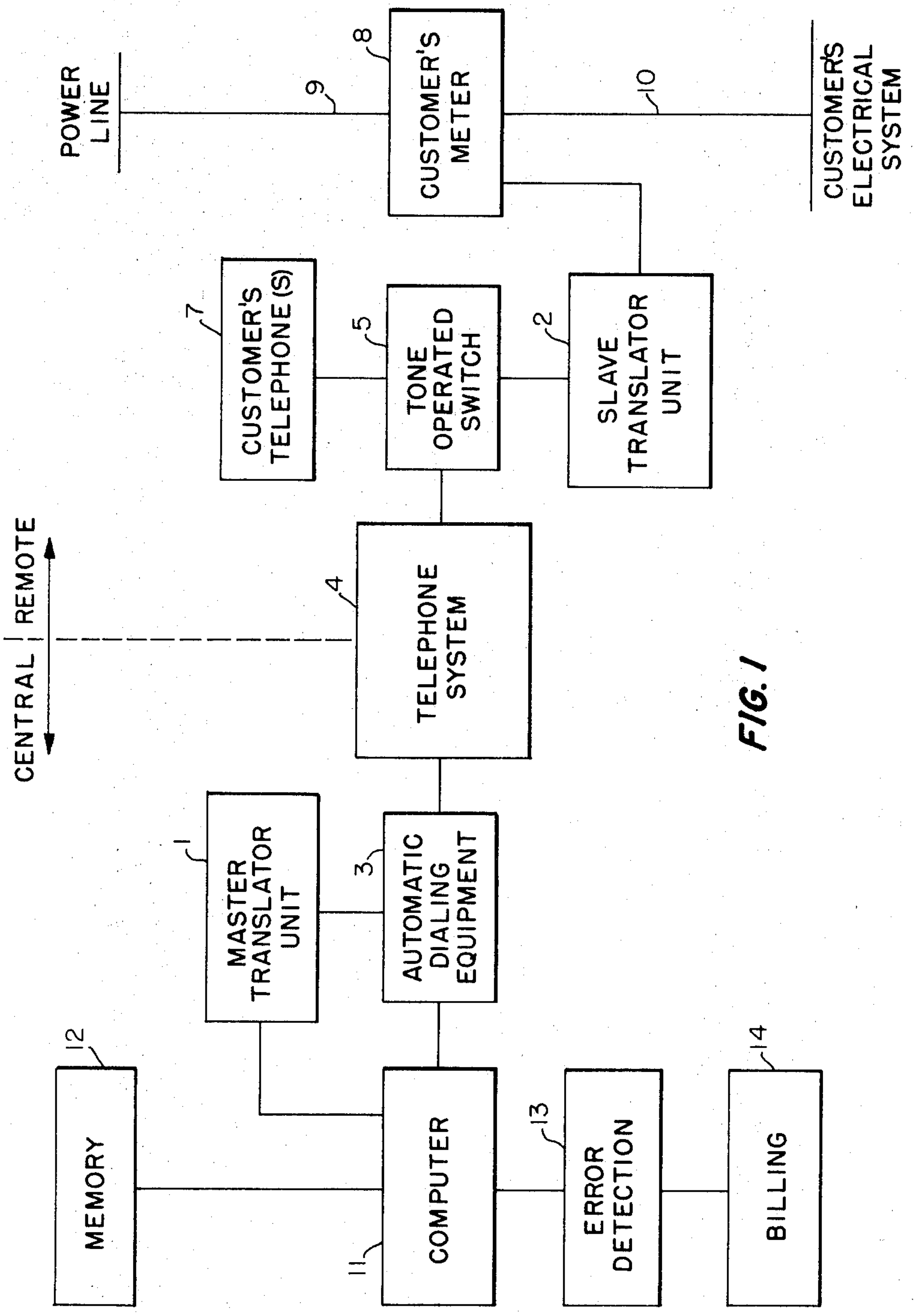
FIG. 1 is a block diagram showing the overall apparatus of the invention and how it is connected into a telephone system.

Referring now to FIG. 1 of the drawings which shows how the entire system is connected together, the two most important parts of the invention are a master translator unit 1 located at a central station, and a slave translator unit 2 remotely located from the central station. The master unit 1 is connected through conventional automatic dialing equipment 3, through a conventional telephone system 4 and then through a tone operated switch 5 connected into the telephone line 6 leading to a customer's telephone 7. The slave unit 2 is connected to the customer's meter 8 which in turn is connected between the customer's incoming power line 9 and the main line 10 leading to the customer's electrical system. While for the purposes of illustrating this invention the meter being read is an electric meter, it should be understood that this system could be used equally as effectively with a gas meter, water meter or any other meter for measuring the amount of utility service used, and may be used to read more than one type of meter for any particular customer.

To briefly summarize the general operation of this system before discussing the detailed operation of the various components, it may be stated that the slave unit 2 contains equipment therein to continuously receive and store information transmitted from the customer's meter 8. There is no continuous contact between the slave unit 2 and the master unit 1, but only between the slave unit 2 and the meter 8. The information stored in the slave unit 2 may be periodically read out by the master unit 1. For example, the master unit 1 may read out the information in the slave unit 2 one time each month. The period of readout time would normally not amount to more than a few seconds. During the preceding month the slave unit 2 continues to receive and store information from the meter 8 to be read out at the desired time. It should be mentioned that in some systems the master unit 1 need not be connected to a computer nor to error detection or billing equipment. When not connected to such equipment the master unit 1 may be activated manually and read out visually by an operator. Whenever the system is operatively connected to a computer, however, the computer determines when it is time to read the meter and sends a signal to the master unit 1 to activate the readout from the slave unit 2. The master unit 1 sends a signal through the automatic dialing equipment 3 through the telephone system 4 and then through the telephone line 6 to a tone operated switch 5 which temporarily disconnects the telephone 7 and connects the slave unit 2 to the line 6 during the readout period. In response to signals from the master unit 1 the translator slave unit 2 sends back responses which are representative of the numbers shown on the meter 8. The master unit 1 decodes this information and sends it to the computer 11 where it is compared with information on previous readings stored in a memory 12 and then passed through an error detection device 13 to an automatic billing apparatus 14 where the customer's bill is automatically prepared. This same sequence is repeated each time the meter is read. Between the reading periods the slave unit 2 continues to record and store information received from the meter 8. The translator unit 2 performs two primary functions; it records binary coded information representative of the amount of utility used as indicated on the meter 8 and it transmits this information to the master translator unit 1 upon a signal from the unit 1.

Figure 3:
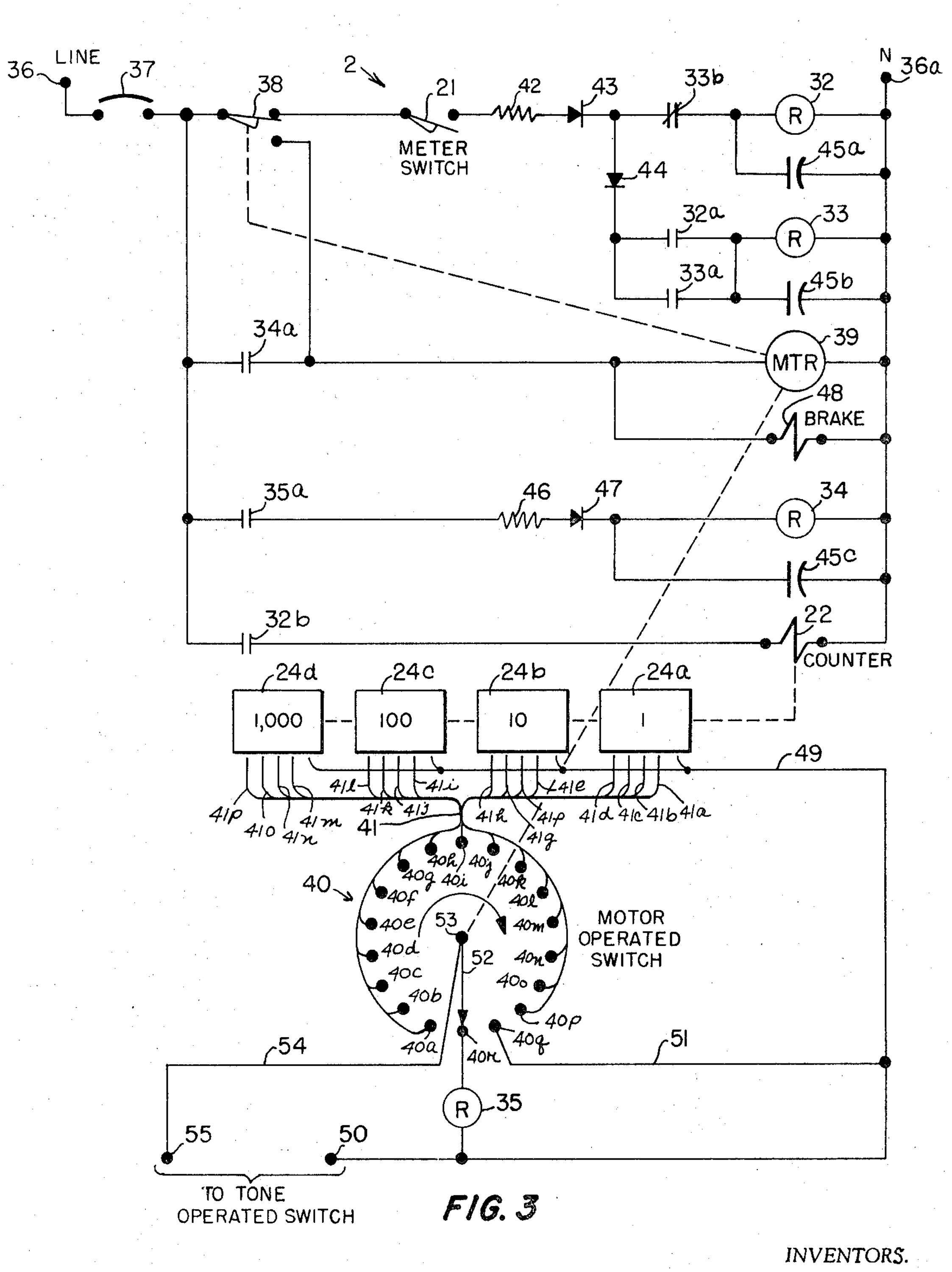
FIG. 3 is a schematic circuit diagram showing the slave translator unit located at a customer's meter.
Figures 4, 5:
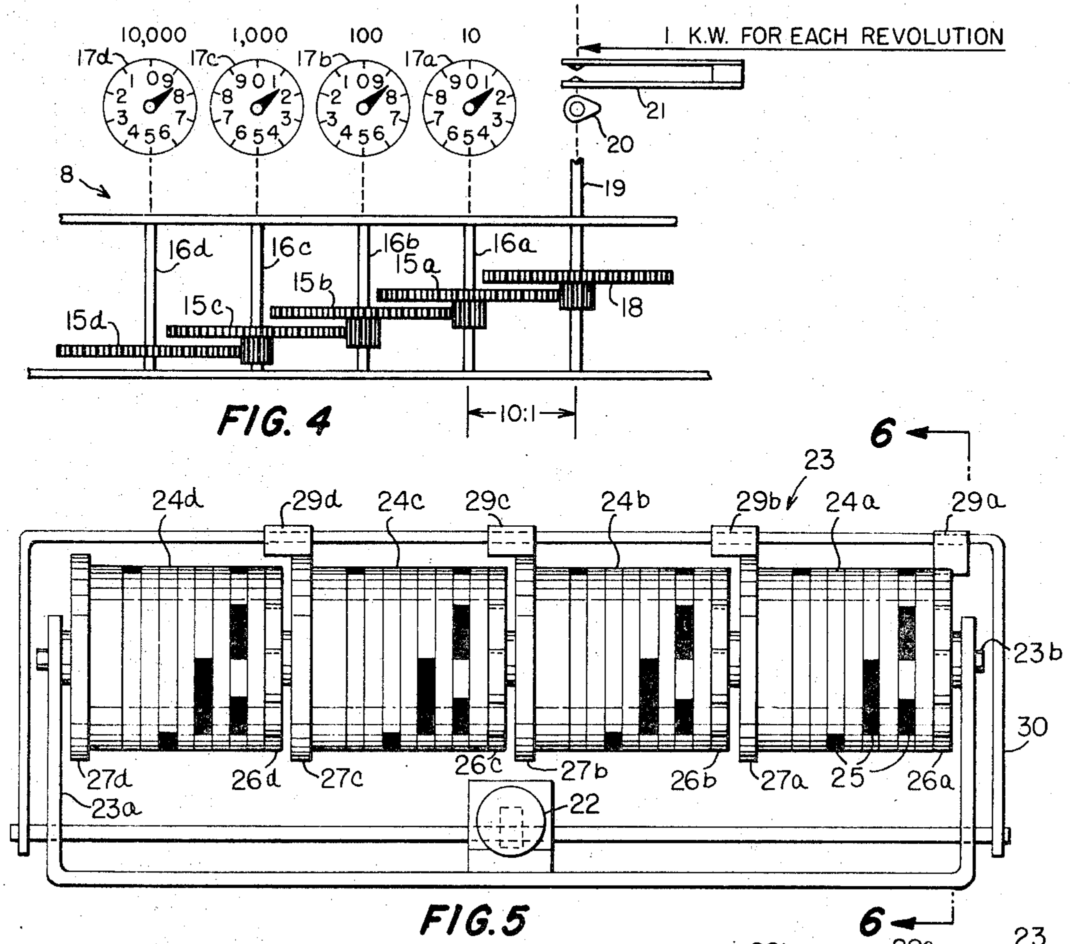
FIG. 4 is a schematic view showing the gear system in a meter and the manner in which a cam on one of the gear shafts actuates a counter switch for counting shaft revolutions.
FIG. 5 is a front view showing a counter assembly of binary code drums used in the slave translator unit.

To describe now in detail the counter apparatus in the slave unit 2, we refer to FIGS. 4 through 10. FIG. 4 shows in a schematic view a portion of the customer's meter 8 having a plurality of intermeshing gears 15*a*, 15*b*, 15*c*, 15*d* with the gears having shafts 16*a*, 16*b*, 16*c*, 16*d* respectively which in turn operate meter dials 17*a*, 17*b*, 17*c*, 17*d* respectively. As shown in FIG. 4, the dials 17*a*, 17*b*, 17*c*, 17*d* each indicate a different digit with one of the dials representing 10's, another 100's, another 1,000's, and another 10,000's. A gear 18 intermeshing with the gear **15*d* rotates a shaft 19 carrying a cam 20 which closes an electrical contact 21 upon each revolution of the shaft 19 and the gear 18. The gear 18 and shaft 19 in this particular instance is designed to rotate once for each kilowatt of electrical power being used. The electrical contact 21 is shown incorporated into the circuitry shown in FIG. 3, the operation of which will be described in detail later in the specification. For the present we will simplify the description of the operation of the counter apparatus by merely saying that each time the contacts 21 are closed by rotation of the shaft 19 and the cam 20, a current flows through appropriate parts of the control circuit shown in FIG. 3 to actuate a solenoid 22 on a counter assembly generally indicated by the numeral 23 and shown in FIGS. 5 and 6**.

Figure 7:
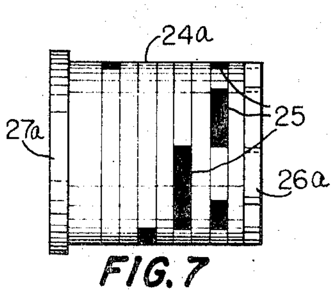
FIG. 7 is a side elevation of one of the binary code drums used in the counter assembly shown in FIG. 5.
Figure 6:
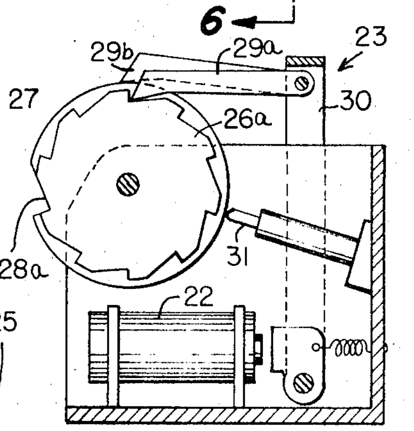
FIG. 6 is a cross-sectional view of the counter assembly taken at line 6–6 of FIG. 5.
Figure 8:
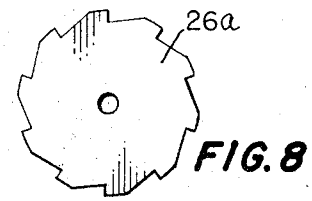
FIG. 8 is an end elevation of a rachet wheel mounted on one end of the drum shown in FIG. 7.
Figure 9:
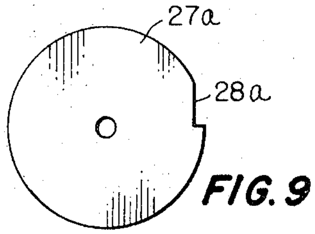
FIG. 9 is an end elevation of a transfer wheel mounted on the opposite end of the drum shown in FIG. 7.

The counter assembly 23, shown in FIGS. 5 and 6, has a frame **23*a* which carries a horizontal shaft 23*b* upon which is rotatively mounted a plurality of binary coded counter drums 24*a*, 24*b*, 24*c*, 24*d*. It will be understood that any number drums may be used, depending upon the particular requirements of the counter and the manner in which the master translator is adapted to receive the signals from the slave unit. Each of the four drums 24*a* through 24*d* are rotatable upon the shaft independently of each other. Each of the drums are made identical to the drum 24*a* shown in FIG. 7 and each drum carries an identical group of electrical contact strips 25, the binary code pattern of which may be seen in the flattened development of the drum surface shown in FIG. 10. It can be readily seen that for each digit shown on the drum there is a different pattern of the contact strips 25 which distinguishes one number from the other when the drum position is being electrically read out. On the right end of the drum 24*a* shown in FIG. 7 is a stepped ratchet wheel 26*a*, having 10 steps around the periphery thereof, the contour of which is shown in FIG. 8. On the opposite end of the drum 24*a* is a transfer wheel 27*a* having only one step 28*a* in the periphery thereof as shown in FIG. 9. Both the ratchet wheel 26*a* and the transfer wheel 27*a* are integrally attached to the drum 24*a* to rotate in unison therewith. Returning now to FIGS. 5 and 6, the identical drums 24*a* through 24*d* are mounted in axial alignment on the shaft 25 in such manner that the transfer wheel 27 of each of the drums is adjacent to the stepped wheel 26 on the next adjacent drum to the left thereof. The stepped ratchet wheel 26*a* on the drum 24*a* is engaged by a pawl 29*a* carried on an actuator yoke member 30 which is operated by the solenoid 22. Each time a kilowatt of power is used and the contact 21 closes, the solenoid 22 causes the pawl 29*a* to advance the stepped wheel 26*a* one step. In addition to the pawl 29*a*, the actuator yoke also carries pawls 29*b*, 29*c* and 29*d*, spaced in such manner upon the yoke member 30 so that each of the respective pawls overlaps a transfer wheel on one drum and the stepped ratchet wheel on the next adjacent drum to the left. For example, the pawl 29*b* overlaps the transfer wheel 27*a* on the drum 24*a* and the stepped wheel 26*b* on the drum 24*b*. Each time the drum 24*a* and the transfer wheel 27*a* rotate one complete revolution, the pawl 29*b* engages the step 28*a* in the transfer wheel 27*a* thereby causing the pawl 29*b* to drop down and simultaneously engage one of the steps of the ratchet wheel 26*b* and advance it and the drum 24*b* one step or one-tenth of a revolution. It may be seen that pawls 29*a* and 29*d* operate in the same manner upon their respective transfer wheels and ratchet wheels to advance each successive drum one-tenth of a revolution for each complete revolution made by the previous adjacent drum on the right thereof. A detent pin 31 engages the periphery of each of the transfer wheels 27*a* through 27*d* to prevent undesirable rotation of the drums during the times that the drums are not being advanced by the pawls. From the foregoing description it may thus be readily seen that each time a kilowatt of power is used, the first drum of the series will advance one-tenth of a revolution and as the power is used the drums continue to advance in such manner that their position gives a representation of the amount of power used when a readout is taken upon the position of the electrical contact strips 25** on all of the drums. The manner of reading out the drums will be described later in the specification.

Figure 10:
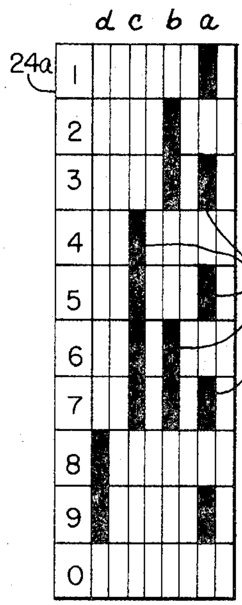
FIG. 10 is a flattened development of the surface of the drum shown in FIG. 7 showing the binary code pattern thereon.

Referring now to FIG. 3, the circuitry which controls the counter drum will now be described. The circuits shown in FIG. 3 contains a series of relays 32, 33, 34, and 35 having relay contacts **32*a*, 32*b*, 33*a*, 33*b*, 34*a* and 35*a* respectively, with the numeral of each contact being similar to the numeral of the relay in which it is located. The power for operating the counter drum solenoid 22 is derived from the power line passing through the customer's meter. The small amount of power required to operate the system may be taken from either side of the meter. As shown in FIG. 3, the terminal 36 is connected to the power line to supply an input voltage through a circuit breaker 37. The terminal 36*a* is connected to a neutral or ground wire. An input voltage passes from the terminal 36 through the circuit breaker 37 and through a normally closed limit switch 38 operated by a motor 39 which drives a multicontact rotary switch 40. As long as the limit switch 38 remains in the normal position, the input voltage is supplied to one of the contacts of the switch 21 operated by the meter driven cam 20 (FIG. 4) as previously described. Each time the switch 21 is closed current flows through a resistor 42 and a diode 43 then through the normally closed relay contact 33*b* to energize the relay 32. When the relay 32 is energized, the contact 32*a* closes and energizes the relay 33. Energization of the relay 32 also closes the contact 32*b* which energizes the counter solenoid 22 to advance the count by one unit on the counter drum 24*a*. A current flowing to either the contact 32*a* or the contact 33*b* passes through a diode 44. When the relay 33 is energized, the contact 33*a* closes to latch the relay 33. The normally closed contact 33*b* opens to drop out the relay 32 and deenergize the counter solenoid 22. The relay 33 remains energized until the meter operated switch 21 opens. From this sequence it can be seen that a counter drum 24*a* advances one full unit each time the meter switch 21 closes and that continuous power is not applied to the solenoid 22 even though the meter switch 21 stops in a closed position due to the stopped position of the cam 20. It should be mentioned at this point that each of the relays 32, 33 and 34 are provided with capacitors 45*a*, 45*b* and 45*c* respectively connected to the input and output of each respective resistor to function as time delay devices for the relays. Connected into the input line of the relay 34 is a resistor 46 and a diode 47. The resistor 42 and diodes 43 and 44 rectifies the current to relays 32 and 33 so that capacitors 45*a* and 45*b* can charge to provide the desired time delay of the relays 32 and 33. Similarly the resistor 46 and diode 47 rectifies the current to relay 34 so the capacitor 45*c* will charge. A solenoid 48 actuates a brake on the motor 39 to stop the motor at a predetermined location after each time it is operated. The motor operated switch 40 has a plurality of contacts 40*a* through 40*p*, each of which is connected through one of the wires of a multiwire switch cable 41 with the wires being connected to contacts 41*a* through 41*p* respectively which ride on the drums 24*a* through 24*d* in such manner that each of the contacts rides on the drum in alignment with one circumferential row of the coded electrical contact strips 25 (FIGS. 7 and 10). Depending upon the position of the drum, each of the contacts 41*a* through 41*p* will either be contacting one of the strips 25 or will be contacting a broken area between the strips. Each contact resting on a strip 25 completes a circuit when the switch 40 rotates to scan the drums. The contacts resting on a broken area between the strips 25 will not complete a circuit when the switch 40 performs its scan. Each of the strips 25 is connected to a common connection which in turn is connected to the line 49 which in turn is connected to the tip or ground line of the customer's telephone line at a terminal 50. The terminals 50 and 55 are actually connected to the telephone line through the tone operated switch 5 shown in FIG. 1. In addition to the previously mentioned contacts 40*a* through 40*p*, the switch 40 has two additional contacts 40*q* and 40*r* which are not connected into the switch cable leading to the counter drums. The contact 40$q$ is connected directly to the ground line 49 by a line 51. The contact 40$r$ connects through relay 35 to the line 49. The switch 40 has a rotary sweep arm 52, one end of which is connected through a center terminal 53 to a line 54 leading to a terminal 55 which in turn connects to the (ring) or power line of the customer's telephone line. When the switch 40 is not performing a scan operation the sweep arm 52 normally has its movable end resting on the contact 40$r$ which is connected through the relay 35 to the ground line 49**.

Referring now to FIGS. 2$a$ and 2$b$, the master translator unit 1 located in the central station obtains its power from a power source 56 through a transformer 57 which provides an AC voltage. Leading from the transformer 57 is a neutral or ground line 58 and a power line 59 which passes through a circuit breaker 60 and a normally open main switch 61. When the main switch 61 is closed a green "power on" indicator light 61$a$ is turned on. The master translator unit 1 has an indicator section 62, a DC power converter section 63, a decoder section 64, a storage relay bank 65, a motor operated switch 95, and other miscellaneous control circuitry which will be described as the specification continues.

The DC power supply 63 is actually a rectifier circuit made up of diodes 66 and 67 and capacitors 68 and 69 connected together in such manner as to convert AC voltage from line 59 to a DC voltage passing through lines 70 and 71 to the decoder section 64. A resistor 72 is connected between the power line 59 and the input of the rectifier circuit 63. The decoder section 64 has four identical sections 64$a$, 64$b$, 64$c$ and 64$d$. Each of these decoding sections correspond to one of the coded counter drums 24$a$ through 24$d$ respectively shown in FIG. 3. In other words, the coded information originated for example in the counter drum 24$a$ after passing from the slave unit 2 to the master unit 1, ultimately passes to the decoder section 64$a$, the information from the drum 24$b$ ultimately passes to the decoder section 64$b$, etc. To simplify the description of the decoder 64, only the decoder section 64$a$ is shown and described in detail since the other three sections are identical.

In order to explain how the coded signals pass from each counter drum to its respective decoder section, the entire sequence of one meter reading operation will now be described. Assuming that the master translator unit 1 is connected to a computer such as the computer 11 shown in FIG. 1, the computer determines when it is time to read any specific customer's meter. The computer sends a signal to the master unit 1 which opens reset contact 73 (FIG. 2$b$) which removes all power from the relay bank 65, causing all the relays in the bank to return to a reset or normal position. A manual reset switch 74 may also be provided in the power line leading to the relay bank 65 for manually clearing the relay bank 65. With the relay bank 65 reset, the computer closes contacts 75 thereby passing a voltage through a resistor 76, through a diode 77, through a normally closed relay contact 79 to energize a relay 78 having relay contacts 78$a$, 78$b$ and 78$c$. When the relay 78 is energized, contact 78$a$ closes, energizing relay 79 which has relay contacts 79$a$, 79$b$, 79$c$ and 79$d$. The relay 78 has a capacitor 80 connected to its input and output to serve as a time delay. The resistor 76 and the diode 77 serves as a rectifier circuit to provide DC current to the capacitor 80. Energization of the relay 78 also closes contact 78 $b$ which energizes a relay 81 and the contact 78$c$ closes, thereby connecting the output of a tone generator 82 through an overload sensor 83 to the (ring) or power line of the telephone line at terminal 84. The tone generator is connected by direct line 85 to the tip or ground line of the telephone line at terminal 86. This signal passing from the tone generator 82 through the telephone line to the slave unit 2 (FIG. 3) energizes the relay 35 in the slave unit 2. If the line is short circuited, however, the overload sensor 83 (FIG. 2$b$) operates to close contacts 83$a$ which energize a relay 87 in the relay banks 65.

When the relay 87 is energized by line fault the contact 87$a$ closes to latch in the relay. The contacts 87$b$ (FIG. 2$a$) close to energize the red "fault" light 100 and the contacts 87$c$ open to prevent a green "verified" light 101 from lighting.

When the relay 79 (FIG. 2$b$) is energized the contact 79$a$ closes to latch the relay 79. Contact 79$b$ opens to drop out relay 78 after a time determined by the size of capacitor 80. Contact 79$c$ closes to connect the tone generator 82 to the telephone line through a counting relay 88 and through the terminal 84. The contact 79$d$ (FIG. 2$a$) closes to energize the red "unverified" light 89. When the relay 81 (FIG. 2$b$) is energized, the contact 81$a$ closes to start the motor 90 and energize a solenoid 91 which releases the brake and permits the motor 90 to run. The relay 81 has a capacitor 92 connected to its input and output as a time delay. A resistor 93 and a diode 94 are connected into the line between the contact 78$b$ and the relay 81 to rectify the current to the relay 81 and permit the capacitor 92 to charge and give the desired time delay. The motor 90 operates a rotary multicontact switch 95 identical to the switch 40 in the slave unit 2 shown in FIG. 3. The switch 95 has a plurality of contacts 95$a$ through 95$r$ which are comparable to the contacts 40$a$ through 40$r$ in the switch 40. The switch 95 has a sweep arm 96 rotating about a center contact 97. The free end of the sweep arm 96 passes in contact with each of the contacts 95$a$ through 95$r$ during one revolution thereof. Once the motor 90 starts, a cam operated limit switch 99 closes until the motor operated switch 95 completes one revolution.

Figure 2A:
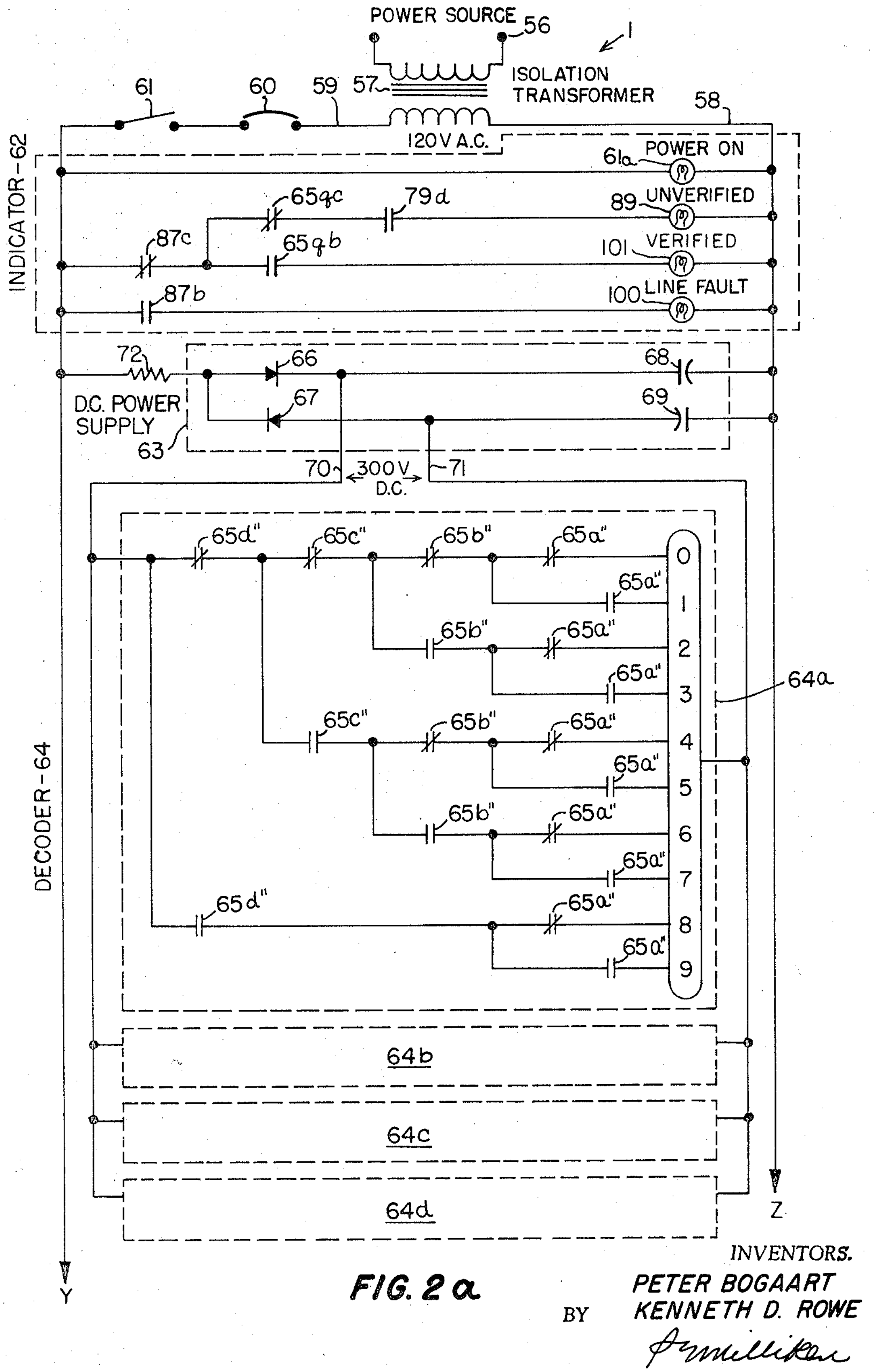
FIGS. 2*a* and 2*b* combine to form a schematic circuit diagram of the master translator unit located in the central station.
Figure 2B:
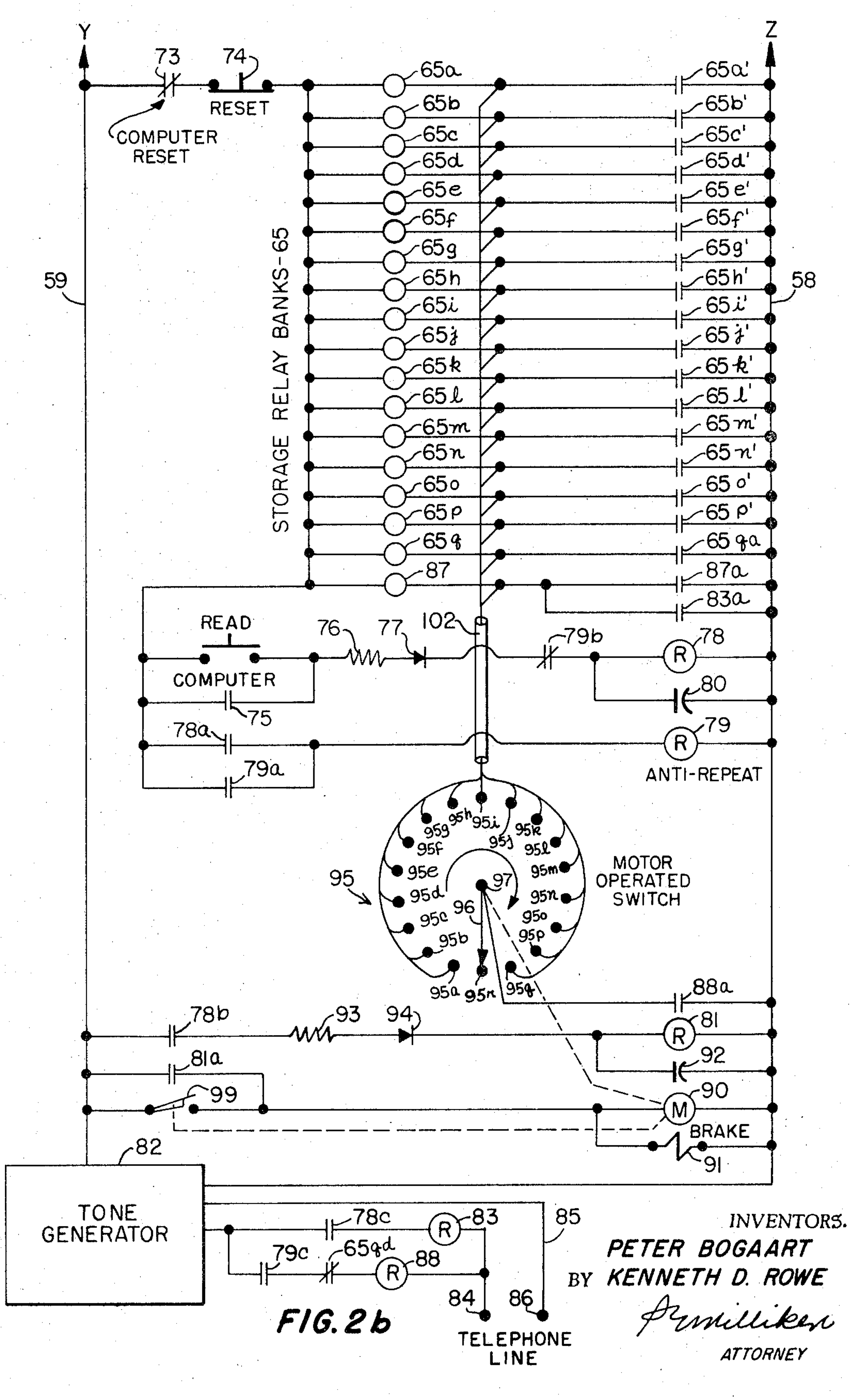

Once the master unit is activated by the computer and the proper sequence of relays operate as previously described, and the desired slave unit 2 has been contacted by the automatic dialing equipment, a signal is passed from the tone generator 82 in the master unit 1 (FIG. 2$b$) through the telephone line to activate the relay 35 (FIG. 3) which closes the contact 35$a$ and energizes the relay 34. Energization of the relay 34 closes the contact 34$a$ to activate the solenoid 48 which releases the brake and to energize the motor 39. Closing of the contacts 34$a$ also causes the tone operated switch 5 (FIG. 1) to disconnect the customer's telephone 7 during the time the meter reading is being taken. The cam operated limit switch 38 (FIG. 3) operates to maintain power on the motor 39 and the tone operated switch 5 (FIG. 1) until one revolution of the motor operated switch 40 (FIG. 3) has been completed. From the foregoing description it will be understood that the synchronous motor 95 in the master unit 1 (FIG. 2$b$) and the synchronous motor 40 in the slave unit 2 (FIG. 3) are started simultaneously. As the sweep arm 96 in the master unit contacts each of the successive points 95$a$ through 95$r$, the sweep arm 52 in the slave unit 2 contacts the corresponding points 40$a$ through 40$4$. Thus it may be seen that each corresponding point in each of the switches 95 and 40 is sequentially connected together through the telephone line. In this manner the information stored in the counter drums 24$a$ through 24$d$ (FIG. 3) can be read out by individually reading out information through each one of the contacts 41$a$ through 41$p$ which contact the counter drums. For example, when the switch arm 52 contacts point 40$a$ on the switch 40, a readout is taken through the contact 41$a$ which rides on one row of the contact strips 25 on the drum 24$a$ (FIG. 5). If the contact 41$a$ is resting on an open space between the contacts 25 of the drum, nothing happens since no circuit is completed and the sweep arm 52 of the switch 40 (FIG. 3) moves to the next contact which is 40$b$. At the same time the sweep arm 96 of switch 95 (FIG. 2$b$) moves to the corresponding contact 95$b$. If the contact 41$b$ is resting on one of the contact strips 25 in the counter drum 24$a$, a circuit is completed from the terminal 55 through the line 54, the terminal 53, the sweep arm 52, the terminal 40$b$, the switch cable 48, the contact 41$b$, through the drum 24$a$, the line 49, and then through the terminal 50 connected to the telephone line. The telephone line at the master unit 1 connects to two terminals 84 and 86 (FIG. 2$b$). A signal transmitted from the tone generator 82 flows through the completed circuit just described in the slave unit 2 and flows through the telephone line to energize the relay 88 (FIG. 2$b$) in the master unit which closes contact 88$a$ thereby completing the circuit through the motor operated switch 95 where it is passed through a line connected to the contact 95$b$. The line from contact 95$b$ is one of the lines in the switch cable 102 which connects the switch 95 to the relays 65*a* through 65*q* in the relay bank 65. By tracing the circuitry from the counter drums to the relay bank, it may be seen that the contacts 41*a* through 51*p* correspond not only to a contact in the switches 40 and 95, but also correspond to one of the relays in the relay bank 65. For example, the contact 41*a* which rides on the counter drum 40*a* corresponds to contact 40*a* in the switch 40, 95*a* in the switch 95, and relay 65*a* in the relay bank 65. Contact 41*b* corresponds to 40*b*, 95*b* and relay 65*b*, etc. In other words, for each counter drum there are four contacts riding on the drum which ultimately pass a signal to four corresponding relays in the relay bank 65. In order to completely read out the information represented by the position of the drum 24*a*, the switches 40 and 95 must move through the first four contacts and in turn any current flowing through these contacts will activate the corresponding relay or relays 65*a* through 65*d* in the relay bank 65. Referring for the moment to the flattened binary code pattern shown in FIG. 10, let us assume that the drum 24*a* (FIG. 3) is in a position where the contacts 41*a* through 41*d* are resting on the proper combination of the contact strips 25 to represent the digit 5. If this is the case, it will readily be observed from FIG. 10 that contacts 41*a* and 41*c* will be resting on one of the contacts 25 and hence will complete a circuit which will activate the corresponding relays 65*a* and 65*c*. The contacts 41*b* and 41*d* will be resting on an open area between the contacts 25 and hence will make no contact and will not activate relays 65*b* and 65*d*. The combination of relays 65*a* through 65*d* in the relay bank 65 (FIG. 2*b*) which are activated will determine which of the corresponding relay contacts in the decoder section 64*a* (FIG. 2*a*) will be activated and the combination of relay contacts activated in the decoder will in turn determine what digit will appear as an output of the decoder. Assuming that the relays 65*a* and 65*c* (FIG. 2*b*) are activated as previously described, these in turn will close corresponding contacts 65*a'* and 65 *c'* to latch the relays 65*a* and 65*c*. These in turn will activate all the corresponding relay contacts 65*a''* and 65*c''* in section 64*a* of the decoder (FIG. 2*a*) and will open the normally closed relays and close the normally opened relays in section 64*a*. By visualizing which contacts have been opened and which have been closed in the decoder section 64*a*, it may be seen that the flow of current is routed through the proper lines to complete a circuit which will light up an indicator light 5 or will produce an output indicating the numeral 5 which may be read directly or fed to a computer. Each of the remaining relays 65*e* through 65*p* in the relay bank 65 (FIG. 2*b*) serves to operate corresponding relay contacts in the decoder sections 64*b* through 64*d* (FIG. 2*a*) in the same identical manner as described regarding section 64*a*. When the final contact 40*q* on the motor operated switch 40 (FIG. 3) provides a direct connection across the telephone lines through the line 51, this connection serves to verify that the line is not open and that the reading taken is therefore correct. When this contact is made and the circuit is completed, the relay 65*q* closes (FIG. 2*b*). The contact 65*qa* closes, latching in the relay, the contact 65*qb* closes energizing the green "verified" light 101 in the indicator section 62 (FIG. 2*a*), the contact 65*qc* opens to extinguish the red "univerified" light 89, and the contact 65*qd* (FIG. 26) opens to prevent the reactivation of the relay 35 (FIG. 3) when the switch 40 in the slave unit 2 returns to the home position 40*r*. When both the switches 40 and 95 return to home positions 40*r* and 95*r* respectively, limit switch 38 opens to stop rotation of the switch 40 and limit switch 99 opens to stop rotation of the switch 95. This completes the sequence for one reading. The computer 11 shown in FIG. 1 then disconnects the master unit 1 from this particular remote unit, the tone operated switch 5 reconnects the customer's telephone 7 and the automatic dialing equipment 3 goes into action to connect to another remote station. It should again be emphasized that the same master translator unit 1 at the central station is used to read any number meters, but a different slave unit is attached to each individual meter. It may be observed from the description of the circuitry and its operation that the circuitry of the slave unit 2 is quite simple and the more complicated circuitry is located at the central station where only one piece of equipment is required.

Figure 11:
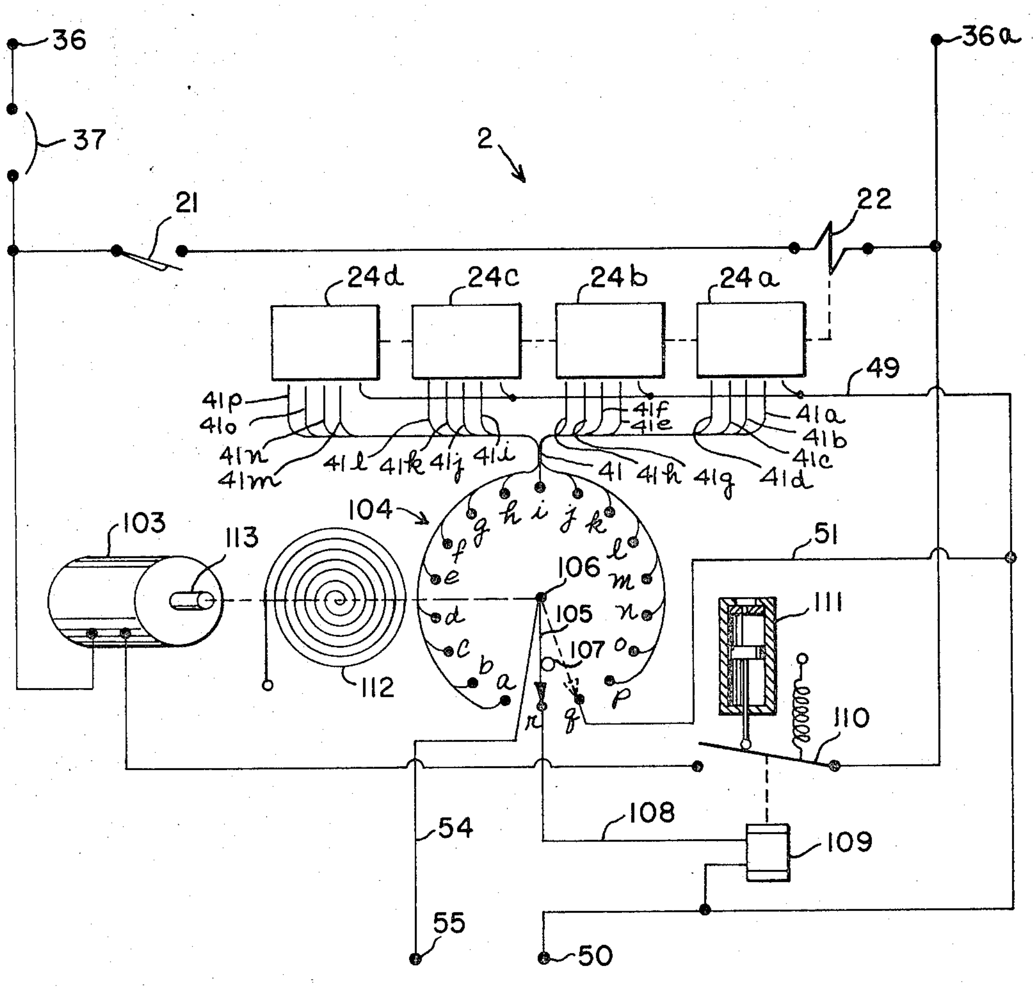
FIG. 11 is a schematic circuit diagram showing another modification of a slave unit which can be substituted for the slave unit shown in FIG. 3.

Another simplified embodiment of the slave translator 2 shown in FIG. 11 may be substituted for the embodiment shown in FIG. 3. For simplicity, the parts in FIG. 11 that are identical to those in FIG. 3 will bear identical numerals and their description will not be repeated in detail. In FIG. 11 a different type of rotary switch is used which eliminates the need for relays 32, 33 and 34, capacitors 45*a*, 45*b*, and 45*c*, and diodes 43, 44, and 47. In FIG. 11 a motor 103 drives a rotary switch 104 having contacts *A*through *r* similar to the contacts 40*a* through 40*r* in the switch 40 in FIG. 3. Each of the contacts *a* through *p* in the switch 104 connects through the switch cable 41 to a corresponding contact of the contacts 41*a* through 41*p* which ride on the rotary drums 24*a* through 24*d* in the same manner as described previously with regard to FIG. 3. Unlike the rotary switch 40, however, the rotation of the switch 104 is not stopped by a brake such as the brake 48. The switch 104 has a sweep arm 105 connected at one end to a center terminal 106. The opposite end of the sweep arm 105 passes across each of the contacts *a* through *q* during the operation of the switch. A fixed stop pin 107 is located in such a position that when the sweep arm 105 is resting in its normal position on the contact *r*, it rests against the left side of the pin 107 which prevents the sweep arm 105 from moving off the contact *r* in a counterclockwise direction. When a signal is received from the master translator unit 1 to indicate the start of a reading cycle, the signal passes from the terminal 55 through the line 54, through the terminal 106, through the sweep arm 105, through the contact *r*, and then through a line 108 to complete the circuit to a relay 109 to close a switch 110 to start the motor 103 which operates the switch 104. When the relay 109 closes the switch 110 the switch is held closed for a predetermined amount of time by a dashpot 111. The time delay provided will be sufficient for the sweep arm 105 to move clockwise from the contact *r* to the contact *q* where it is stopped by the stop pin 107, at which time the switch 110 will reopen to turn off the motor 103. A spring 112 is attached to the motor shaft 113 which rotates the sweep arm 105 and when the sweep arm 105 is rotated clockwise from terminal *r* to terminal *q*, the spring 112 is wound by the rotation of the shaft 113. When the motor 103 shuts off, the tension of the spring 112 reverses the rotation of the shaft 113 and causes the sweep arm 105 to return in a counterclockwise direction to the normal position on the contact *r*.

It may be seen that the switch 104 serves the same purpose as the switch 40 in FIG. 3 in providing a sequential readout of the information represented by the position of the drums 24*a* through 24*d*. The only difference between the two rotary switches is the manner in which they are reset to the starting position so that their rotation is synchronized with the rotation of the switch 95 in the master translator 1 shown in FIG. 2*b*. It is also obvious that the switch 95 in the master translator 1 could be reset in the same manner as the switch 104.

It should be understood that more than one type of customer's meter can be read by this apparatus and it is only necessary to operatively attach one of the slave translator units 2 to each different type of meter to be read, and assuming that all the readings of the different utilities are to be handled by the same central station, only one master translator unit would be required. The master translator unit would require, however, a multitone tone generator which would generate a different tone signal to activate each different translator unit attached to each different meter. The tone operated switch such as the switch 5 shown in FIG. 1 could be used not only to disconnect the customer's telephone, but could also be used to select which slave translator unit would be activated.

It is obvious that solid state devices such as transistors and the like could be used in place of the various relays used throughout both the master translator unit and the slave translator unit. It is also obvious that other minor modifications in circuit components which are well known in the art can be substituted for those illustrated in this application without departing from the scope of the invention.

We claim:

1. An apparatus for reading a customer's utility meter at a remote station over a telephone line from a central station comprising:
A. a master translator unit located at a central station and connected to a telephone system;
B. a slave translator unit located at a remote station and connected to a meter to be read and to a telephone line which is normally connected to the telephone of the customer whose meter is to be read and to the telephone system serving the master translator;
C. a counter and storage unit in the slave unit actuated by a single rotary member of the customer's meter to count the number of units of the item being metered at the same time that each unit is registered on the meter and store the count results as individual bits of coded information retained in the slave unit until a readout is called for by the master unit;
D. a slave readout selector switch in the slave unit which determines the readout sequence of the bits of coded information stored in the counter and storage unit;
E. a multisection decoder in the master translator unit;
F. a master readout selector switch in the master translator unit synchronized with the slave readout selector for directing each bit of coded information to the proper location in the decoder section; and
G. a signal generator to provide signals to the slave translator unit to perform a readout of the coded information stored in the counter and storage unit.

2. A meter reading apparatus as claimed in claim 1 wherein the counter and storage unit comprises a plurality of rotary coded members having electrical contact strips arranged in a coded pattern thereon to make or break a plurality of electrical circuits in the counter and storage unit, depending upon the relative position of said rotary coded members, each of the rotary coded members corresponding to one of the visual dials on the meter to be read and the rotational position of each rotary coded member at any given time being related to the amount shown on the meter dial to which it corresponds, one of the rotary coded members being actuated in response to one of the rotary shafts in the meter and each of the other rotary coded members being actuated by the preceding adjacent rotary coded member.

3. A meter reading apparatus as claimed in claim 2 wherein the code pattern of the contact strips is a binary code.

4. A meter reading apparatus as claimed in claim 2 wherein at least one of the rotary coded members of the counter and storage unit are rotated a fractional part of one revolution by a solenoid each time one unit of the utility is used.

5. A meter reading apparatus as claimed in claim 4 wherein the solenoid which advances the rotary coded members is energized by the closing of a counter switch which is closed by a cam attached to one of the rotary shafts in the customer's meter.

6. A meter reading apparatus as claimed in claim 5 wherein the rotary coded members are cylindrical drums rotatably mounted in axial alignment on a shaft with each successive drum rotating a fraction of a revolution each time the preceding drum rotates one complete revolution.

7. A meter reading apparatus as claimed in claim 6 wherein each drum has a multitoothed ratchet wheel on one end and a single step transfer wheel on the opposite end, both of said wheels being fixed to the drum for rotation therewith.

8. A meter reading apparatus as claimed in claim 1 wherein the slave readout selector switch and the master readout selector switch comprise synchronized multicontact rotary motor driven switches, each switch having contacts corresponding to the contacts in the opposite switch.

9. A meter reading apparatus as claimed in claim 8 wherein each of the rotary switches are stopped on the same contact on each respective switch after each revolution by a solenoid operated brake.

10. A meter reading apparatus as claimed claim 8 wherein a sweep arm in each of the rotary switches is stopped by a fixed pin and is returned to its original position by a spring which reverses the direction of travel of the sweep arm when the motor operating the switch turns off.

11. A meter reading apparatus as claimed in claim 1 wherein the decoder is made up of combinations of normally open and normally closed relays arranged in a code pattern corresponding to the code pattern of the counter and storage unit.

12. A meter reading apparatus as claimed in claim 1 wherein the signal generator is located in the master translator unit.

13. A meter reading apparatus as claimed in claim 1 including a computer connected to the master translator unit for calculating the customer's utility bill from the output information provided by the master translator.

14. A meter reading apparatus as claimed in claim 13 including automatic error detection and billing apparatus operated by the output of the computer.

15. A method of reading a customer's meter at a remote station over a telephone line from a central station comprising:
A. continuously counting at the remote station, the number of units of the item being metered at the same time each unit is registered on the meter;
B. continuously storing at the remote station, the count results as individual bits of coded information with each bit being represented by the relative position of an electrical contact which either makes a completed circuit or an uncompleted circuit in a counter and storage unit;
C. periodically sending signals from the central station over the telephone line to the remote station;
D. selectively connecting each of the circuits in the counter and storage unit through the telephone line to a corresponding circuit in the central station; and
E. selectively connecting each corresponding circuit in the central station to a corresponding portion of a decoder circuit in the central station to produce a readout of the electrical signals from the remote station which is indicative of the count recorded on the storage unit at the time.

16. A method of reading a customer's meter as claimed in claim 15 including the step of feeding the output information from the decoder to a computer for calculating the amount of the customer's utility bill and feeding the output of the computer to error detection and billing equipment for automatically preparing the customer's bill.